United States Patent
Lee et al.

(10) Patent No.: US 10,155,165 B2
(45) Date of Patent: *Dec. 18, 2018

(54) SYSTEM AND METHOD FOR INCREASING ATTRIBUTES OF A VIRTUAL ITEM

(71) Applicant: Electronic Arts Inc., Redwood City, CA (US)

(72) Inventors: Kevin Lee, Fremont, CA (US); Christopher Yu, San Francisco, CA (US); Aaron Port, Alamo, CA (US); Daniel Hoffman, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,333

(22) Filed: Jan. 23, 2018

(65) Prior Publication Data

US 2018/0147492 A1 May 31, 2018

Related U.S. Application Data (63) Continuation of application No. 15/209,698, filed on Jul. 13, 2016, now Pat. No. 9,901,826.

(51) Int. Cl.
| | |
|---|---|
| *A63F 9/24* | (2006.01) |
| *A63F 13/58* | (2014.01) |
| *H04L 29/06* | (2006.01) |
| *A63F 13/79* | (2014.01) |
| *A63F 13/20* | (2014.01) |
| *A63F 13/335* | (2014.01) |

(52) U.S. Cl.
CPC ............ *A63F 13/58* (2014.09); *A63F 13/20* (2014.09); *A63F 13/335* (2014.09); *A63F 13/79* (2014.09); *H04L 67/38* (2013.01)

(58) Field of Classification Search
None
See application file for complete search history.

(56) References Cited

U.S. PATENT DOCUMENTS

| | | | |
|---|---|---|---|
| 6,493,722 B1 | 12/2002 | Daleen | |
| 8,287,383 B1 * | 10/2012 | Etter | ............ H04L 67/38 463/42 |
| 2012/0142429 A1 | 6/2012 | Muller | |

(Continued)

OTHER PUBLICATIONS

Profession—WoWWiki—Your guide to the World of Warcraft URL http://www.wowwiki.com/professional [retrieved Nov. 19, 2014], 10 pgs.

(Continued)

*Primary Examiner* — Paul A D'Agostino
(74) *Attorney, Agent, or Firm* — Knobbe, Martens, Olson & Bear, LLP (57) ABSTRACT

One aspect of the present disclosure relates to increasing an attribute of a virtual item type in a virtual space. Users, having virtual item instances of a virtual item, may be presented with an offer to increase a performance level of virtual item instances of the virtual item as a group in exchange for pooled consideration from the users as a group. The performance level of the virtual item instances of the virtual item may be increased as a group in exchange for the users, as a group, tendering the pooled consideration.

20 Claims, 8 Drawing Sheets

(56) References Cited

U.S. PATENT DOCUMENTS

| | | | |
|---|---|---|---|
| 2013/0097005 A1 | 4/2013 | Yang | |
| 2014/0004959 A1* | 1/2014 | Kahrs | A63F 13/49 |
| | | | 463/42 |
| 2014/0100020 A1* | 4/2014 | Carroll | A63F 13/12 |
| | | | 463/25 |
| 2014/0108134 A1 | 4/2014 | Desmond | |
| 2014/0122218 A1 | 5/2014 | Jacob Sushil | |
| 2014/0274409 A1 | 9/2014 | Tinsman | |
| 2014/0358651 A1* | 12/2014 | Koh | G06Q 30/0209 |
| | | | 705/14.12 |
| 2015/0306494 A1 | 10/2015 | Pieron | |

OTHER PUBLICATIONS

Cataclysm Guide: Guild Advancement—Wowhead URL: http://www.wowhead.com/guide=cataclysm&guilds [retrieved on Nov. 19, 2014], 5 pgs.

* cited by examiner

| ATTRIBUTE | NUMBER OF REQUIRED PARTICIPANTS | NUMBER OF PARTICIPANTS |
|---|---|---|
| ARMOR | 90 | 88 |
| FLIGHT DISTANCE | 50 | 35 |
| FIRE POWER | 95 | 92 |
| SPEED | 60 | 53 |

UPGRADE PARTICIPATION
HELICOPTER GUN SHIP

FIG. 5

UPGRADE PARTICIPATION HELICOPTER GUN SHIP

| ATTRIBUTE | CUMULATIVE AMOUNT REQUIRED | CUMULATIVE AMOUNT COLLECTED |
|---|---|---|
| ARMOR | €27,000 | €26,400 |
| FLIGHT DISTANCE | €12,500 | €8,750 |
| FIRE POWER | ◈ 1,900 | ◈ 1,840 |
| SPEED | ◈ 420 | ◈ 3,180 |

SYSTEM AND METHOD FOR INCREASING ATTRIBUTES OF A VIRTUAL ITEM

FIELD OF THE DISCLOSURE

This disclosure relates to systems and methods for increasing attributes of a virtual item in an online game.

BACKGROUND

Online games are known. Virtual items within online games are known. Virtual items may be acquired (e.g., bought using virtual or real currency), traded (e.g., in exchange or another virtual item or in exchange of a service), won (e.g., during an online competition, battle, etc.), and/or found. Examples of online games are battle card games, which traditionally, allow players to only invest in their personal cards to make them stronger.

SUMMARY

One aspect of the disclosure relates to a system for increasing attributes of a virtual item in an online game. In some implementations, users, having virtual item instances of a virtual item, may be presented with an offer to increase a performance level of virtual item instances of the virtual item as a group in exchange for pooled consideration from the users as a group. The performance level of the virtual item instances of the virtual item may be increased as a group in exchange for the users, as a group, tendering the pooled consideration. In some implementations, the system may comprise one or more online game servers, one or more client computing platforms, one or more secondary servers, one or more external resources and/or other components, some or all of which may be communicatively coupled via a network.

The system for increasing attributes of a virtual item may include one or more servers. The servers may operate in a client/server architecture with one or more client computing platforms. The client computing platforms may be associated with the users of the online game. The servers may include one or more processors configured by machine-readable instructions to execute one or more components. The components may include one or more of: a game component, a user component, a virtual item component, a relationship component, an offer component, a consideration component, a performance component, and/or other components. In some implementations, the client computing platforms may be configured to execute one or more components the same as or similar to the servers and/or processors.

The game component may be configured to execute one or more instances of an online game. The instance of the online game may include a virtual space associated with the online game. The game component may receive commands from client computing platforms associated with users. The commands may be executed within the online game to facilitate participation of the users in the online game through a client game application implemented on the client computing platforms. Views of the online game and/or a virtual space in which the online game takes place may be presented to the client by transmitting view information over a network to the client computing platforms. The views of the game space may be presented in game interfaces for the online game on the client computing platforms and/or display devices of the client computing platforms by running the client game application. In some implementations, the system may include one or more physical computer processors configured by machine-readable instructions that may cause the one or more physical computer processors to implement an instance of an online game in which multiple users participate in the online game.

The system may manage instances of virtual items usable by users in the online game. The virtual item component may be configured to manage instances of virtual items. In some implementations, the individual ones of the virtual items may have a virtual item type. Individual ones of the virtual items and/or instances of the virtual items may have a performance level associated with an attribute of the virtual item. The virtual items may include a virtual item having a first virtual item type and a first performance level associated with a first attribute of the first virtual item.

The system may manage user accounts of users. The user component may be configured to manage user accounts of users. The user accounts may include inventories of virtual items useable in the online game by the users. The user accounts may include a first user account having a first inventory for the first user. The first inventory may indicate that the first user has a first virtual item instance of a first virtual item for use in the online game. The user accounts may include a second user account having a second inventory for the second user. The second inventory may indicate that the second user has a second virtual item instance of the first virtual item for use in the online game.

In some implementations, the one or more physical computer processors may be configured to manage affiliations within the online game. The relationship component may be configured to manage the affiliations with the online game. A given affiliation within the online game may include a discrete group of users with a relationship. The relationship may and/or may not have a functional significance within the online game. For example, affiliations may have a functional impact on the gameplay of the users within the affiliation. The affiliations within the online game may include a first affiliation of a first discrete group of users including a first user and a second user.

In some implementations, the one or more physical computer processors may be configured to facilitate presentation of an offer to users to increase a performance level of virtual item instances of the first virtual item as a group. The offer component may be configured to facilitate presentation of an offer to users. The one or more physical computer processors may be configured to facilitate presentation of the offer to increase a performance level of virtual item instances of the first virtual item in exchange for pooled consideration from the users as a group. For example, a first offer to increase a performance level of virtual item instances of the first virtual item may be presented to the first user and the second user. In some implementations, the first user and the second user may be presented with the offer to increase a performance level of virtual item instances of the first virtual item responsive to the first user and the second user having instances of the first virtual item in the first and second inventories.

In some implementations, the one or more physical computer processors may be configured to increase the performance levels of the virtual item instances of the first virtual item as a group. The virtual item component may be configured to increase performance levels of the virtual item instances of the virtual item as a group. Increasing the performance levels of the virtual item instances of the virtual item as a group may be responsive to receiving the pooled consideration from the users as a group. The first virtual item instance and/or the second virtual item instance may be increased for the first user and/or the second user in exchange for the first user and/or the second user tendering a first amount of consideration. The increase of performance level of the virtual item instances may result in an increase of the performance level of the first virtual item instance and the second virtual item instance.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
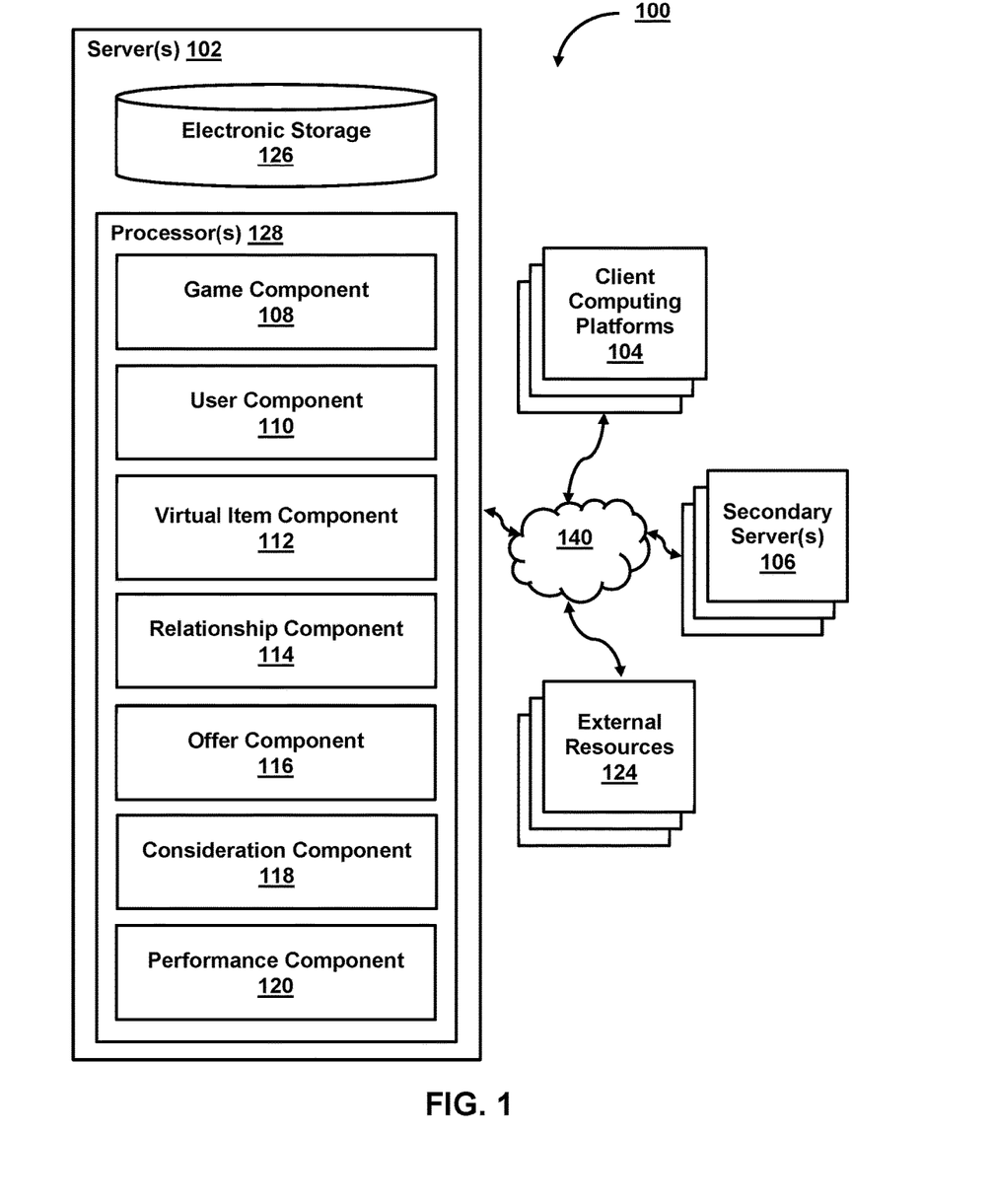
FIG. 1 illustrates a system for increasing attributes of a virtual item in an online game, in accordance with one or more implementations.

FIG. 1 illustrates a system 100 for increasing attributes of a virtual item in an online game. Users, having virtual item instances of a virtual item, may be presented with an offer to increase a performance level of virtual item instances of the virtual item as a group in exchange for pooled consideration from the users as a group. The performance level of the virtual item instances of the virtual item may be increased as a group in exchange for the users, as a group, tendering the pooled consideration. Users, having virtual item instances of a virtual item, may be presented with an offer to increase a performance level of virtual item instances of the virtual item as a group in exchange for pooled consideration from the users as a group. The performance level of the virtual item instances of the virtual item may be increased as a group in exchange for the users, as a group, tendering the pooled consideration. In some implementations, as shown in FIG. 1 system 100 may comprise a game server(s) 102 and a second server(s) 106. Game server(s) 102 may be configured to provide an online game in a virtual space to users of system 100 through client computing platform(s) 104 associated with the users. Second server(s) 106 may be configured to provide other services and/or experiences to users of the system 100. Game server(s) 102, server(s) 106, and client computing platform(s) 104 may be configured to communicate with each other and/or with other components within or outside of system 100 according to one or more client/server architectures.

Game server(s) 102 may be configured by machine-readable instructions to execute one or more computer program components. The one or more computer program components may include one or more of a game component 108, a virtual item component 110, a user component 112, a relationship component 114, an offer component 116, a consideration component 118, a performance component 120, and/or other components.

The game component 108 may be configured to executed an instance of an online game. Game component 108 may be configured to implement the instance of the online game. The online game may be played within a game space. The game space may comprise a virtual space. Game component 108 may be configured to determine the state of the virtual space. The state may then be communicated (e.g., via streaming visual data, via object/position data and/or other state information) from server(s) 102 to client computing platform(s) 104 for presentation to users. The game component 108 may be configured to implement an instance of an online game playable in the game space in which multiple users participate in the online game. The game component 108 may be configured to facilitate user participation in the online game by effectuating transmission of information related to the instance of the online game to client computing platform(s) 104 on which views of the online game are presented to users. Transmission of the state may be accomplished via network 140. The state determined and transmitted to a given client computing platform(s) 104 may correspond to a view for a user character in an online game being controlled by a user via the given client computing platform(s) 104. The state determined and transmitted to a given client computing platform(s) 104 may correspond to a location in the virtual space and/or online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The game space may include a virtual space. The instance of the virtual space and/or game space in which the online game is played may comprise a simulated space that is accessible by users via clients (e.g., client computing platform(s) 104) that present the views of the virtual space and/or game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous and/or semi-synchronous.

The above description of the manner in which state of the virtual space and/or game space determined by game component 108 is not intended to be limiting. Furthermore, the use of virtual space, game space, and/or online game is not intended to be limiting. Both terms may be used either separately or interchangeably and may refer to consistent or inconsistent items and/or concepts. The game component 108 may be configured to express the virtual space and/or game space in a more limited or more rich manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place beyond the relatively generic graphics. For example, a view may include a generic battle graphic with a textual description of the opponents to be confronted. Other expressions of individual places within the virtual space are contemplated.

Within the instance(s) of the virtual space, game space, and/or online game executed by game component 108, users may control characters, objects, simulated physical phenomena (e.g., wind, rain, earthquakes, and/or other phenomena) and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the online game by controlling one or more of the available user controlled elements in the game space. Control may be exercised through control inputs and/or commands input by the users through client computing platform(s) 104. Game component 108 may be configured to enable interaction of the users with the online game and/or each other by performing operations in the game space in response to commands received from the users. The users may interact with each other through communications exchanged within the virtual space. Such communications may include one or more of textual chat, instant messages, private messages, voice communications and/or other communications. Communications may be received and entered by the users via their respective client computing platform(s) 104. Communications may be routed to and from the appropriate users through one or more servers 102 (e.g., through space component 110).

The user component 110 may be configured to access and/or manage one or more user profiles, user accounts, and/or user information associated with users of the system 100. The one or more user profiles, user accounts, and/or user information may include information stored by server(s) 102, server(s) 106, one or more of the client computing platforms 104, one or more external resources 124, and/or other storage locations. The user profiles and/or accounts may include for example, information identifying users (e.g., a username or handle, a number, an identifier, and/or other identifying information) within the virtual space and/or online game, security login information (e.g., a login code or password), virtual space and/or online game account information, subscription information, virtual currency account information (e.g., related to currency held in credit for a user), relationship information (e.g., information related to relationships between users in the virtual space), virtual space and/or online game usage information, demographic information associated with users, interaction history among users in the virtual space and/or online game, information stated by users, purchase information of users, browsing history of users, a client computing platform identification associated with a user, a phone number associated with a user, and/or other information related to users.

The user accounts may be configured to store inventories of virtual items useable in the online game by the users. A given user inventory managed by user component 110 may provide an accounting of virtual items, such as virtual currencies, resources, objects, units, and/or any other game space elements that have been procured, controlled by, and/or otherwise associated with a given user in the game space. Such accounting of virtual items may reflect balances of the virtual items, e.g., a quantity of these virtual items, associated with the given user in the game space. The virtual items in a given user inventory may include virtual currencies, resources, objects usable in the game space (e.g., weapons, equipment, garments, etc.), units (e.g., troops), and/or any other virtual items. By way of a non-limiting example, the given user may have an X number of virtual currencies, a Y number of a virtual resources (e.g., iron, ore, wood, coal, etc.), and a Z number of troops in the inventory associated with the given user.

Balances of virtual items in the user inventory may increase, replenish, or exhaust in response to the user acquiring or consuming the virtual items. For example, the users may acquire virtual items through a virtual store operated by the provider of the online game. As another example, the users may acquire or exhaust items by way of user actions in the game space (e.g., activating a probability item bundle in the user inventory, harvesting resources, consuming resources for crafting, etc.). For instance, construction actions initiated by users may consume specific resources in accordance with resource requirements associated with the construction actions, and the user inventory may exhaust the specific resource in the user inventory during execution of the construction. Conversely, users may acquire probability item bundles, resources, virtual items, and/or other game space elements in the game space, and the balance of the virtual items in the user inventory may increase accordingly to reflect the acquisition by the user.

In some implementations, the user accounts may include a first user account having a first inventory for the first user indicating that the first user has a first virtual item instance of a first virtual item for use in the online game. The user accounts may include a second user account having a second inventory for the second user indicating that the second user has a second virtual item instance of the first virtual item for use in the online game. Inventories of virtual items may include resources that are available to users in the virtual space. A virtual item may be an item that can be used in a virtual world to assist a user character.

Figure 2A:
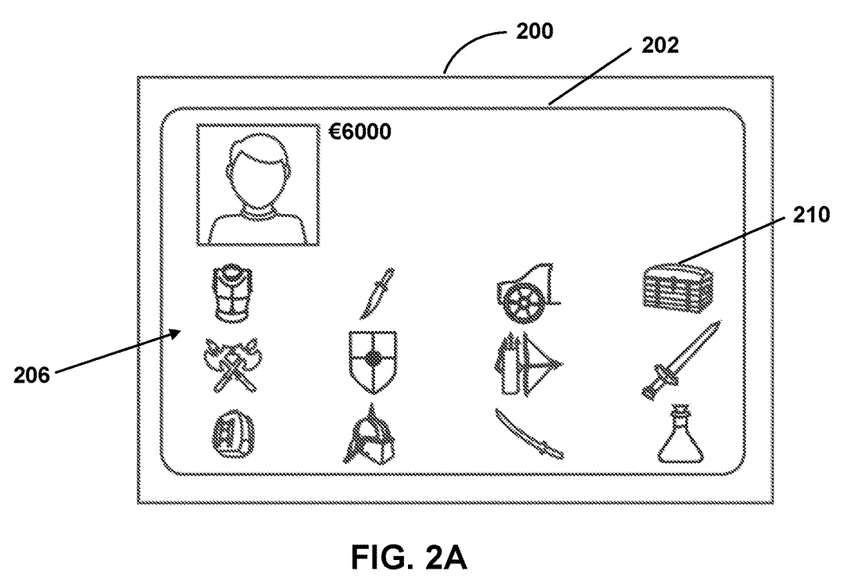
FIGS. 2A-2B illustrate a user interface configured to facilitate the presentation of views representing instances of virtual items in inventories belonging to users in the virtual space, in accordance with one or more implementations.
Figure 2B:
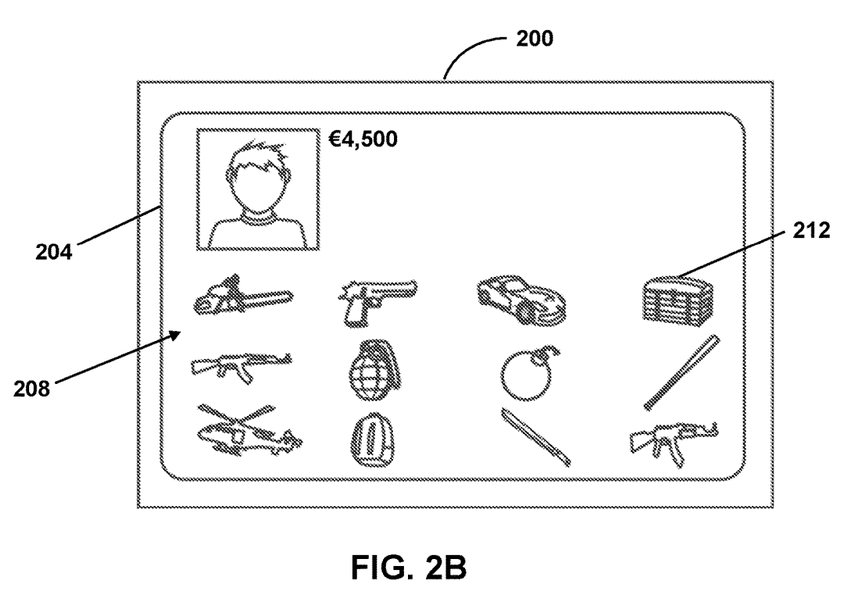

FIGS. 2A-2B illustrate a user interface 200 presented to users on one or more client computing platforms 104 (as shown in FIG. 1), in accordance with one or more implementations. User interface 200 may facilitate presentation of views representing instances of virtual items in inventories belonging to users in the virtual space. FIG. 2A illustrates a user interface 200 presented to a first user. User interface 200 may facilitate the presentation of a view 202 representing instances of virtual items 206 in the inventory belonging to the first user. The instances of virtual items 206 include a first instance 210 of a chest. FIG. 2B illustrates a user interface 200 presented to a second user. User interface 200 may facilitate the presentation of a view 204 representing instances of virtual items 208 in the inventory belonging to the second user. The instances of virtual items 208 include a second instance 212 of the chest. In this example, the first user and the second user have and/or own instances of the same virtual item, the chest.

Examples of virtual items include, but are not limited to, virtual currency (money, valuable metals or gems, etc.), weapons, spell components, defense components, attack components, armor, and/or other virtual items. In some implementations, the virtual items may include battle cards. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a user character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other user characters.

Returning to FIG. 1, the inventories managed by user component 110 may include one or more virtual awards collected by the one or more users. The inventory for a given user may be accessed through an interface. As the user-character progresses through the game it may receive access to higher-level gear. Higher-level gear may be more powerful and/or effective within the game. This may include having parameters (e.g., hit points, attack strength, defense points, speed, and/or other parameters) that enhance the functionality of the gear in the game. The user may be able to review items within the user's inventory and equip the user character with an item appropriate to the current game situation. Items may be dragged from the inventory to a preview window. As items are selected, they may appear either on or next to the user character. For example, if the user character is currently not wearing any armor and/or accessories, armor and accessories such as a cape may be added by accessing the user's inventory. The user's inventory may be associated with one or more user characters. As such, for example, the virtual items within a given user's inventory may be usable and/or wearable by the one or more user characters controlled by the given user. Users may collect, trade, buy, fight over items, and/or perform other actions to add to their inventory. Games in different genres, such as science fiction, may incorporate items specific to that genre. For example, laser guns may be substituted in place of swords as the standard weapon used by user characters within a science fiction-type game. The data describing clothing and other equipment or gear may be stored in a character record.

Relationship component 112 may be configured to manage affiliations within the online game. Such affiliations may include one or more of friendships, guilds (with guild-mates), alliances, connections, followers, and/or other relationships. The relationship component 112 may establish relationships based on relationship requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. Affiliations may include one or more types of affiliations that have a functional purpose or impact within the virtual space, and/or one or more types of affiliations that a social construct within the virtual space that does not have a functional result.

In some implementations, the user accounts of the users may include indications of one or more affiliations having a functional significance between users. This may include having an impact on cooperative gameplay between users such that users belonging to the same affiliation may have more cooperative gameplay options and/or actions available to them, may perform actions toward a common goal and/or in assistance of each other that are more effective than users not part of a common affiliation, may be privy to enhanced communication features, and/or other impacts to cooperative gameplay. Such affiliations may include a discrete group of users with a relationship having a functional significance within the online game. The affiliations within the online game may include a first affiliation of a first discrete group of users including a first user and a second user. For example, the accounts of users may indicate associations of the users with one or more affiliations. The accounts may include a first user account for a first user having an indication that the first user is associated with a first affiliation, a second user account for a second user having an indication that the second user is associated with the first affiliation, and/or any other user accounts including. The first user and the second user may be members of the same affiliation having a functional significance within the online game.

Users belonging to an affiliation may have relationships with some or no functional significance, purpose, and/or impact within a given virtual space. Such relationships within the affiliation may include a leadership structure, a role structure, and/or other relationships within the affiliation. The functional significance of an affiliation and/or relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as obtaining, acquiring, sharing, and/or trading goods, services, user characters, and/or items in the virtual space; and/or other capabilities among users belonging to an affiliation.

Figure 3:
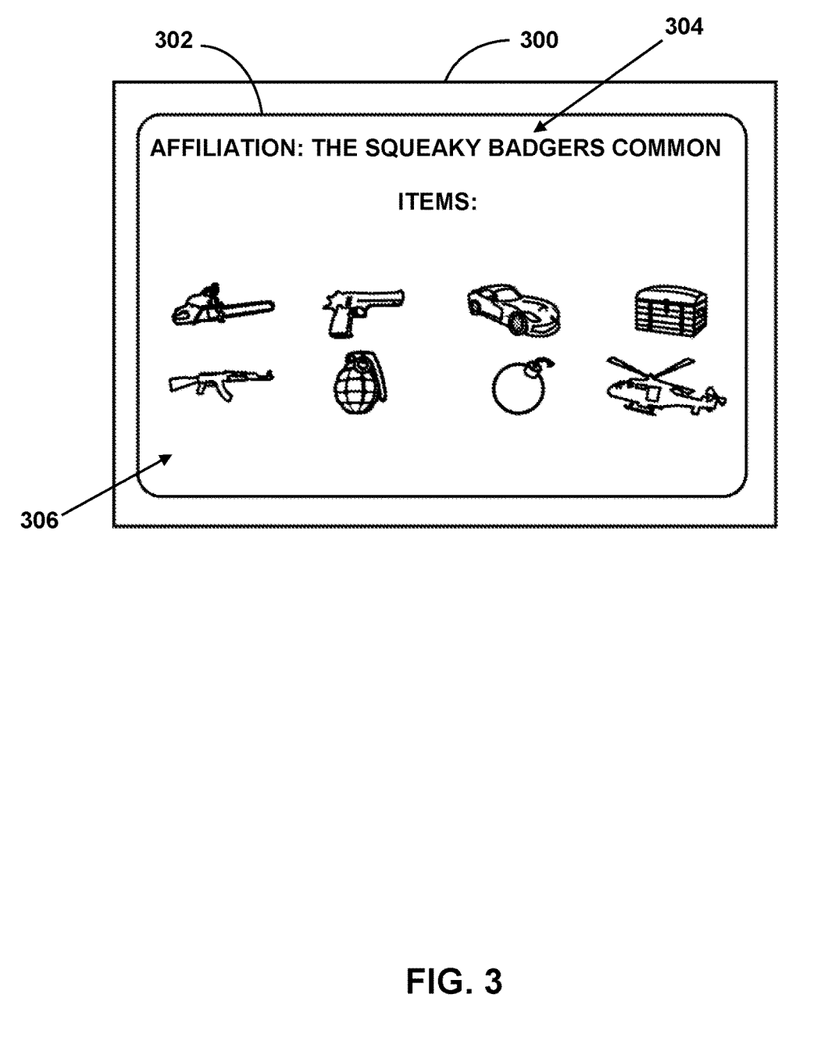
FIG. 3 illustrates a user interface configured to facilitate the presentation of views representing user affiliations, in accordance with one or more implementations.

FIG. 3 illustrates a user interface 300 presented to users on one or more client computing platforms 104 (as shown in FIG. 1) in accordance with one or more implementations. User interface 300 may facilitate the presentation of views representing user affiliations. User interface 300 may facilitate the presentation of a view 302 representing affiliation 304. Affiliation 304 includes a group of users called "The Squeaky Badgers" having instances of virtual items 306.

Returning to FIG. 1, offer component 116 may be configured to facilitate presentation of an offer to users to increase a performance level of virtual item instances of one or more virtual items as a group. In some implementations, the performance level of virtual item instances of the one or more virtual items may be increased as a group in exchange for pooled consideration from the users as a group. The offer may be presented to users within and/or as a group. The offers may be presented to the users as a group responsive to the users having and/or owning instances of the one or more virtual items. Increasing a performance level of the virtual item instances of one or more virtual items may include adjusting an attribute associated with the virtual item instances. For example, the attributes may include one or more of a power and/or impact associated with a virtual item instance, a resistance and/or defense associated with a virtual item instance, a resource production quantity and/or rate of a virtual item instance, a speed associated with a virtual item instance, a size and/or capacity of a virtual item instance, a quality of a virtual item instance, and/or other attributes of a virtual item instance. By way of non-limiting example, if the virtual item instance is a gun, increasing the performance level of the instance of the gun may include adjusting the fire power of the gun, the accuracy of the gun, the ammo recharge rate of the gun, distance the gun can shoot, the damage inflicted by the gun, and/or otherwise adjusting one or more attributes of the gun and/or its use within the virtual space. By way of another non-limiting example, if the virtual item instance is a resource mine, increasing the performance level of the instance of the resource mine may include adjusting the rate the resource is produced, the capacity, the quantity of resources mined, the type of resources mined, the quality of resources mined, and/or otherwise adjusting the resource mine.

The performance level of the virtual item instances may be increased by generating game state information indicating a change and/or update to the virtual item instances within user inventories. Game state attributes and game rules/outcomes affected by the change and/or update may be indicated by the game state information. The game state information indicating the change and/or update may cause the inventories of the users and/or the affected game state attributes and rules/outcomes to reflect the change and/or update within the game space.

In some implementations, an offer may be presented to users to increase a performance level of virtual item instances of the first virtual item as a group in exchange for pooled consideration from the users as a group. The offer may be presented to the users responsive to the users owning instances of the first virtual item. For example, the offer may be presented to the first user and the second user. The offer may be presented to the first user and the second user responsive to the first user and the second user having instances of the first virtual item in the first and second inventories.

Figure 4:
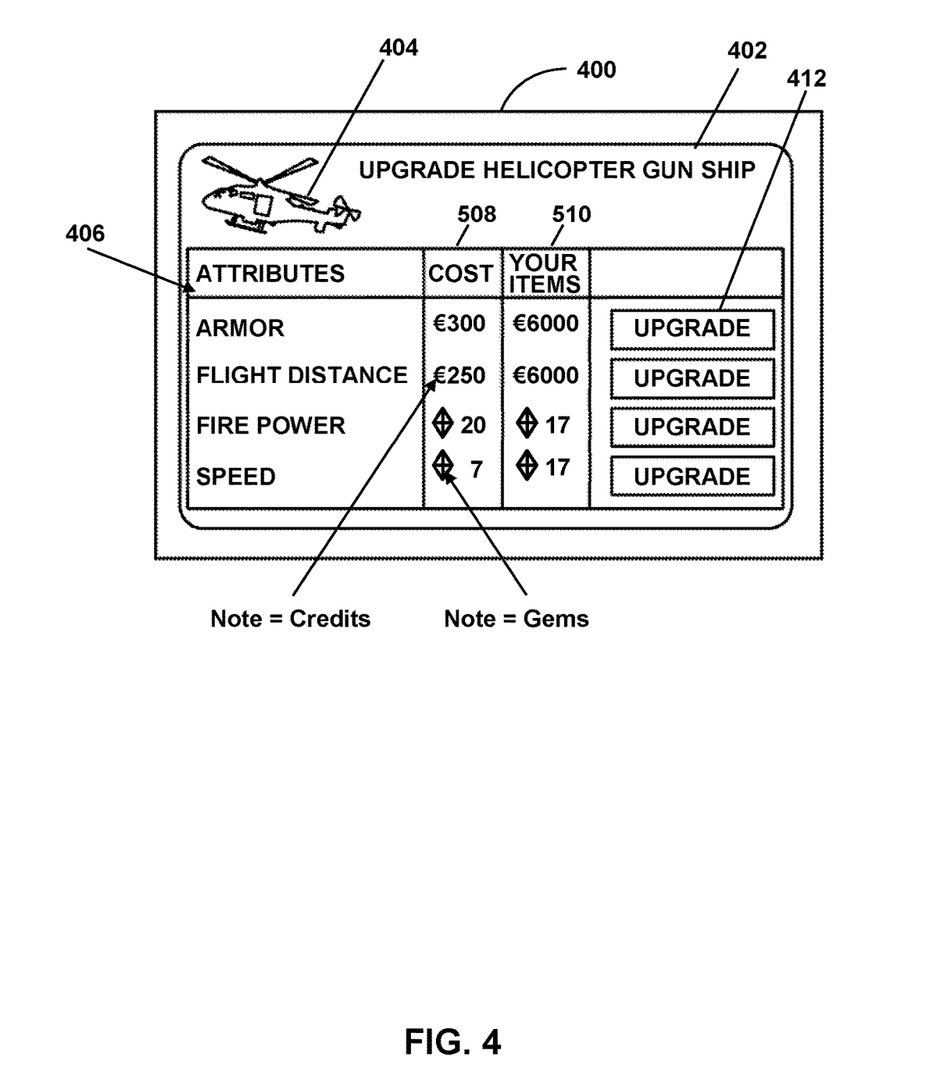
FIG. 4 illustrates a user interface configured to facilitate the presentation of views representing offers to increase performance levels of instances of virtual items, in accordance with one or more implementations.

FIG. 4 illustrates a user interface 400 presented to users on one or more client computing platforms 104 (as shown in FIG. 1), in accordance with one or more implementations. User interface 400 may facilitate the presentation of views representing offers to increase performance levels of instances of virtual items. User interface 400 may facilitate the presentation of a view 402 representing an offer to increase performance levels of an instance of virtual item 404 (helicopter gun ship). View 402 includes attributes 406 of the instance of the virtual item 404. In this example, attributes 406 include armor, flight distance, fire power, and speed. The view 205 of the offer includes the consideration 408 needed to increase individual ones of attributes 406, and upgrade 412 for each attribute individually. For example, to increase performance level of the armor of the instance of helicopter gun ship 404, 300 credits are needed, and to increase the speed seven gems are needed. View 402 includes the user's inventory of gems and credits units 410.

Returning to FIG. 1, offer component 116 may be configured to present one or more offers to increase performance levels as an option displayed within a user interface. By way of non-limiting example, the user interface may display the offer such as "Do you want participate in a group upgrade to increase the speed of the helicopter for 10 gems?"

In some implementations, consideration component 118 may be configured to receive consideration from one or more of the users. Consideration component 118 may receive consideration from the users as a group. Consideration component 118 may pool the consideration received from the users as a group. Consideration component 118 may calculate an amount of pooled consideration received from one or more users as a group. The number and/or identity of the users contributing the consideration may be tracked and/or monitored by consideration component 118.

Consideration component 118 may be configured to determine a user threshold. The user threshold may indicate a quantity of users that are required to contribute to the first amount of pooled consideration as a group in order to increase the performance of the instances of one or more virtual items. The user threshold may include a threshold number of users tendering the pooled consideration as a group. The user threshold determined by user managing component 110 may include a fixed number of users, or a number that varies based on one or more of how many users are participating in the online game and/or are part of the group (e.g., the affiliation), how many users have an instance of the virtual item in their inventory, and/or other considerations. The user threshold may be uniform and/or variable. In some implementations, the user threshold may be may be specific to the virtual item or uniform for all virtual items.

Consideration component 118 may be configured to facilitate presentation of a notification, to users, of the user threshold. The notification of the user threshold may be presented to users before, after, and/or along with the offer to increase a performance level of instances of a virtual item. The notification of the user threshold may indicate the user threshold specific to a virtual item, the number of users needed to reach the user threshold, the number of users who pooled their consideration, and/or other indications. In some implementations, the notification may indicate multiple user thresholds corresponding to multiple virtual items.

Figure 5:
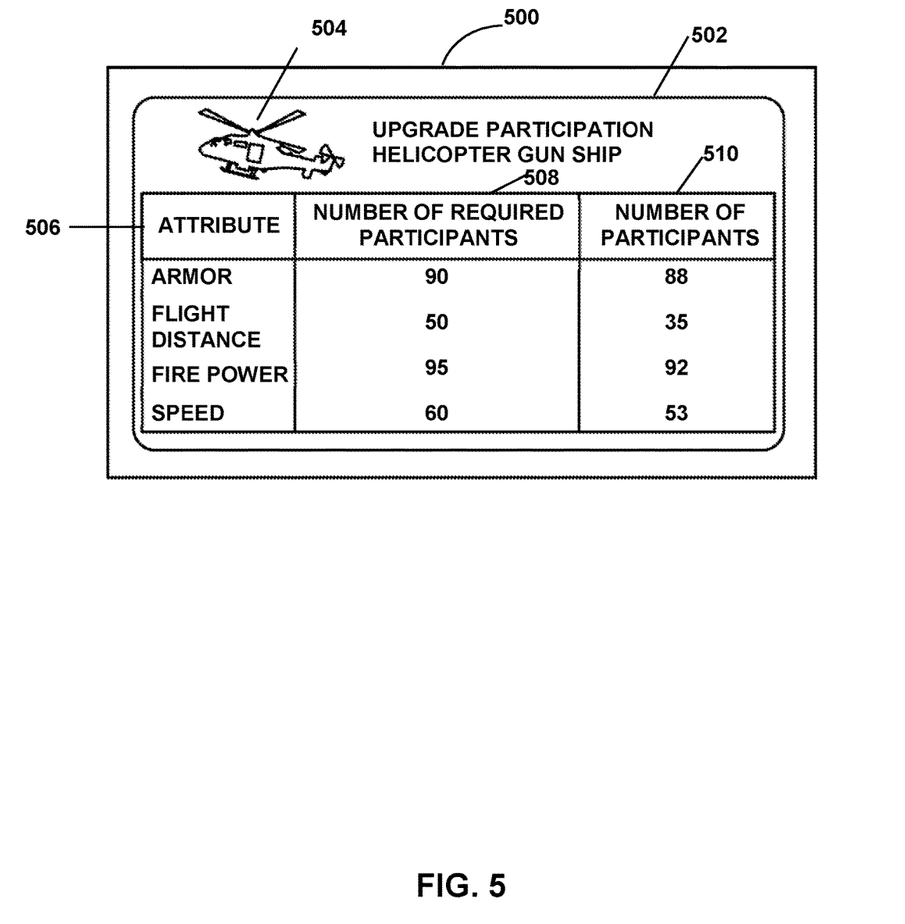
FIG. 5 illustrates a user interface configured to facilitate the presentation of views representing notifications of user thresholds, in accordance with one or more implementations.

FIG. 5 illustrates a user interface 500 presented to users on one or more client computing platforms 104 (as shown in FIG. 1), in accordance with one or more implementations.

User interface 500 may facilitate the presentation of views representing notifications of user thresholds. User interface 500 may facilitate the presentation of a view 502 representing a notification of user thresholds 508 for individual attributes 506 of virtual instances of helicopter gun ship 504 and the number of users needed 510 to reach the threshold for each attribute. For example, to increase the performance level of the armor instances of the helicopter gun ship the threshold number of users who need to tender the pooled consideration is 90. To continue the example, 88 users have tendered the consideration and two more users are still needed to reach the threshold number 90.

Returning to FIG. 1, consideration component 118 may be configured to determine a consideration threshold amount, indicating the amount of pooled consideration, by a group of users, at which the performance level of a virtual item instances will be increased. The consideration threshold amount determined by consideration component 118 may include a fixed amount, or an amount that varies based on one or more of how many users are participating in the online game and/or in the group (e.g., an affiliation), how many users have an instance of the virtual item in their inventory, and/or other considerations. The consideration threshold may vary and/or maybe uniform across the game/virtual space. The consideration threshold may be may be specific to the virtual item. The consideration threshold may and/or may not be uniform for all virtual items. In some implementations, consideration component 118 may be configured to facilitate presentation of a notification, to users, of the consideration threshold. The notification of the consideration threshold may be presented to users, before, after, and/or with the offer to increase a performance level of instances of a virtual item. In some implementations, the notification of the consideration threshold may indicate the consideration threshold specific to a virtual item, the number of users needed to reach the consideration threshold, the number of users who pooled their consideration, the amount pooled, the amount needed to reach the consideration threshold, and/or other indications. In some implementations, the notification may indicate multiple consideration thresholds corresponding to multiple virtual items.

The consideration component 118 and/or game providers may be considered to determine user threshold and/or consideration threshold values based on a number factors. For example, the factors may include a game space balance goal that is important to the provider(s) of the game space, such as to increase sales of certain virtual items in the game space, to incentivize users to activate acquired instances of virtual items in their inventories, to increase or reduce circulation of certain virtual items in the game space, to incentivize users to spend virtual currencies to purchase certain items, to promote certain gameplays newly introduced in the game space, and/or any other game space balance goals. In some exemplary implementations, such threshold values may be determined dynamically in accordance with the programming rules configured into the consideration component 118. For example, a programming rule may be configured into the consideration component 118 such that the threshold values may be correlated with the number of virtual items for which the performance level of the virtual item instances have been increased in a period of time in the game space. For instance, the more of such virtual items for which the performance level of the virtual item instances have been increased, the higher the threshold values may be, and vice versa.

Figure 6:
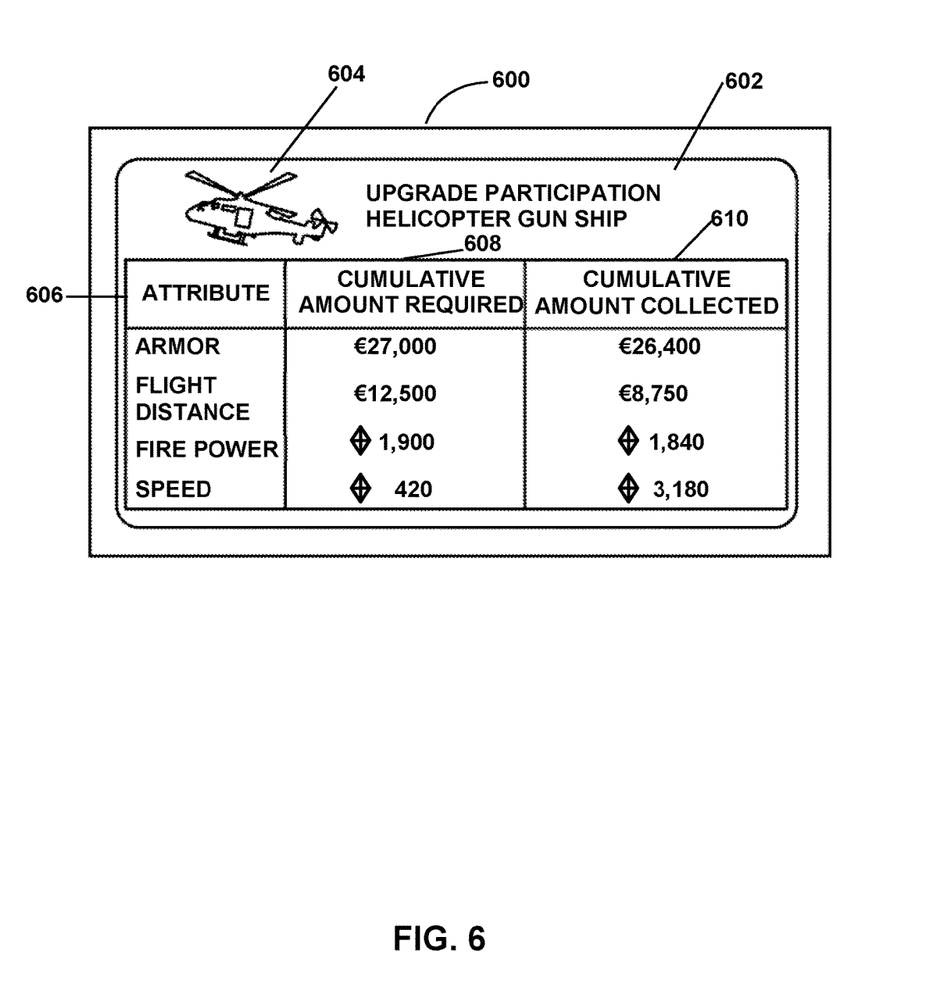
FIG. 6 illustrates a user interface configured to facilitate the presentation of views representing notifications of consideration thresholds, in accordance with one or more implementations.

FIG. 6 illustrates a user interface 600 presented to users on one or more client computing platforms 104 (as shown in FIG. 1), in accordance with one or more implementations. User interface 600 may facilitate the presentation of views representing notifications of consideration thresholds. User interface 600 may facilitate the presentation of a view 602 representing a notification of consideration thresholds 608 for individual attributes 606 of virtual instances of helicopter gun ship 604 and the amount needed 610 to reach the consideration threshold for each attribute. For example, to increase the performance level of the armor instances of the helicopter gun ship the consideration threshold amount needed to be tendered is 27,000 credit units. 26,400 credit units have been tendered by users and 600 credit units are still needed to reach the consideration threshold amount 27,000.

Returning to FIG. 1, performance component 120 may be configured to manage the performance level of one or more of the virtual item instances. In some implementations, performance component 120 may be configured to increase the performance level of the virtual item instances of the one or more virtual items. Increasing the performance level of the virtual item instances of the one or more virtual items may be in exchange for the users as a group tendering the pooled consideration. Increasing the performance level of the virtual item instances of the one or more virtual items may result in an increase of the performance level of the one or more virtual items instances. For example, performance component 120 may be configured to increase the performance level of the virtual item instances of the first virtual item. The performance level of the virtual item instances of the first virtual item may be increased in exchange for the users as a group tendering the pooled consideration. Increasing the performance level of the virtual item instances of the first virtual item may result in an increase of the performance level of the first virtual item instance and the second virtual item instance.

In some implementations, performance component 120 may be configured to increase the performance level of the virtual item instances of the first virtual item as a group responsive to the users in the group breaching the user threshold determined by consideration component 118. For example, performance component 120 may compare the number of users tendering the pooled consideration with the user threshold. If the number of users tendering the pooled consideration reaches the user threshold, performance component 120 may increase the performance level of the virtual item instances of the first virtual item as a group. If the number of users tendering the pooled consideration does not reach the user threshold, then the virtual item performance component may not increase the performance level of the virtual item instances of the first virtual item as a group. In some implementations, if the number of users tendering the pooled consideration does not reach the user threshold number, offer component may be configured to facilitate presentation of a notification to the users indicating the number of users needed to reach the user threshold number.

In some implementations, performance component 120 may be configured to increase the performance level of the virtual item instances of the first virtual item as a group responsive to the users in the group breaching the consideration threshold determined by consideration component 118. For example, performance component 120 may compare the consideration amount tendered by the users with the consideration threshold. If the consideration amount tendered by the users reaches the consideration threshold, performance component 120 may increase the performance level of the virtual item instances of the virtual item for the group. If the consideration amount tendered by the users does not reach the consideration threshold amount, then the virtual item performance component may not increase the performance level of the virtual item instances of the virtual item. In some implementations, if the consideration amount tendered by the users does not reach the consideration threshold amount, offer component 116 and/or consideration component 118 may be configured to facilitate presentation of a notification to the users indicating the amount needed to reach the consideration threshold amount.

In some implementations, performance component 120 may increase the performance level of one or more virtual item instances of one or more virtual items if the number of users reaches the user threshold, In some implementations, the performance level of one or more of the virtual item instances of the one or more virtual items may be increased regardless of whether or not the consideration threshold is reached. In some implementations, performance level of one or more of the virtual item instances of one or more of the virtual items may be increased if the amount of the consideration pooled by the users reaches the consideration threshold amount. In some implementations, the one or more of the virtual item instances of the one or more virtual items may be increased regardless of whether or not the user threshold is reached. In some implementations performance level of the virtual item instances of the virtual item may be increased responsive to the number of users reaching the user threshold and the amount of the consideration pooled by the users reaches the consideration threshold.

In some implementations, performance component 120 may be configured to increase the performance level of the virtual item instances of the virtual item proportionally to the number of users tendering the pooled consideration, and/or the amount of the pooled consideration tendered by the users. In some implementations, the performance level of the virtual item instances of the virtual item may be proportional to the number of users tendering towards the threshold consideration regardless of whether or not the consideration threshold is met. In some implementations, the performance level of the virtual item instances of the virtual item may be proportional to amount of the consideration tendered by the users regardless of whether or not the user threshold is met.

Figure 7:
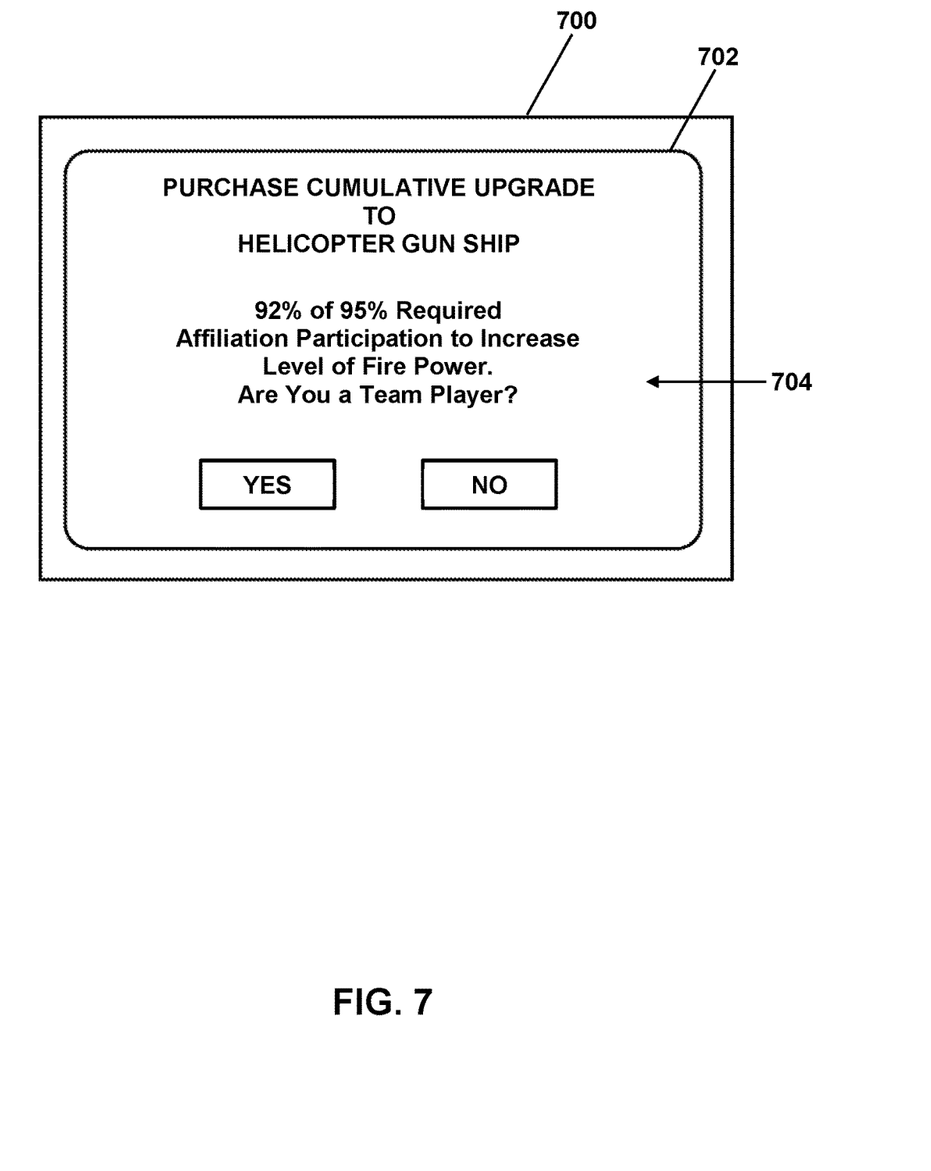
FIG. 7 illustrates a user interface configured to facilitate the presentation of views representing notifications to users in an affiliation, in accordance with one or more implementations.

FIG. 7 illustrates a user interface 700 presented to users on one or more client computing platforms 104 (as shown in FIG. 1), in accordance with one or more implementations. User interface 700 may facilitate the presentation of views representing notifications to the users in an affiliation. User interface 700 may facilitate the presentation of a view 702 representing an offer to a user in an affiliation, to participate in the offer to increase performance levels of instances of fire power of the helicopter gun ship. View 702 includes notification 704 to the user indicating the percentage of users in the affiliation participating in the offer (92%), and the threshold percentage of users from the affiliation (95%) to increase performance levels of instances of fire power of the helicopter gun ship.

Returning to FIG. 1, the online game server 102, the alternative server 106, client computing platform(s) 104 and/or external resources 124 may be operatively linked via one or more electronic communication links. For example, such electronic communication links may be established, at least in part, via a network 140 such as the Internet and/or other networks. It will be appreciated that this is not intended to be limiting, and that the scope of this disclosure includes implementations in which servers 102 and 106, client computing platform(s) 104 and/or external resources 124 may be operatively linked via some other communication media.

A given client computing platform 104 may include one or more processors configured to execute computer program components. The computer program components may be configured to enable an expert or user associated with the given client computing platform(s) 104 to interface with system 100 and/or external resources 124 and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 124 may include sources of information, hosts and/or providers of virtual environments outside of system 100, external entities participating with system 10 and/or other resources. In some implementations, some or all of the functionality attributed herein to external resources 124 may be provided by resources included in system 10.

The game server 102 may include electronic storage 126, one or more processors 128 and/or other components. The alternative server 106 may include, one or more processors, electronic storage, and/or other components. The components of game server 102 may be the same or similar to the components of alternative server 106. The servers 102 and 106 may include communication lines, or ports to enable the exchange of information with a network 140 and/or other computing platforms. Illustration of servers 102 and 106 in FIG. 1 is not intended to be limiting. The servers 102 and 106 may include a plurality of hardware, software and/or firmware components operating together to provide the functionality attributed herein to servers 102 and 106. For example, servers 102 and 106 may be implemented by a cloud of computing platforms operating together as servers 102 and 106.

Electronic storage 126 may comprise electronic storage media that electronically stores information. The electronic storage media of electronic storage 126 and 44 may include one or both of system storage that is provided integrally (i.e., substantially non-removable) with servers 102 and 106 and/or removable storage that is removably connectable to servers 102 and 106 via, for example, a port (e.g., a USB port, a firewire port, etc.) or a drive (e.g., a disk drive, etc.). Electronic storage 126 and 44 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.) and/or other electronically readable storage media. The electronic storage 126 and 44 may include one or more virtual storage resources (e.g., cloud storage, a virtual private network and/or other virtual storage resources). Electronic storage 126 and 44 may store software algorithms, information determined by processors 128 and 36, information received from servers 102 and 106, information received from client computing platforms 16, and/or other information that enables servers 102 and 106 to function as described herein.

Processor(s) 128 is configured to provide information processing capabilities in servers 102 and 106, respectively. As such, processors 128 and 36 may include one or more of a digital processor, an analog processor, a digital circuit designed to process information, an analog circuit designed to process information, a state machine and/or other mechanisms for electronically processing information. Although processor(s) 128 is shown in FIG. 1 as a single entity in each server 102 and 106, this is for illustrative purposes only. In some implementations, processor(s) 128 may include a plurality of processing units. These processing units may be physically located within the same device, or processor(s) 128 may represent processing functionality of a plurality of devices operating in coordination. The processor(s) 128 may be configured to execute components 108, 110, 112, 114, 116, 118, 120 and/or other components. Processor(s) 128 may be configured to execute components 108, 110, 112, 114, 116, 118, 120 and/or other components by software, hardware, firmware, some combination of software, hardware and/or firmware and/or other mechanisms for configuring processing capabilities on processor 128 and 36.

It should be appreciated that although components 108, 110, 112, 114, 116, 118, 120 and/or other components are illustrated in FIG. 1 as being co-located within processing units 128 and 36, in implementations in which processors 128 and 36 include multiple processing units, one or more of components 108, 110, 112, 114, 116, 118, 120 and/or other components may be located remotely from the other components. The description of the functionality provided by the different components 108, 110, 112, 114, 116, 118, 120 and/or other components described herein is for illustrative purposes, and is not intended to be limiting, as any of components 108, 110, 112, 114, 116, 118, 120 and/or other components may provide more or less functionality than is described. For example, one or more of components 108, 110, 112, 114, 116, 118, 120 and/or other components may be eliminated, and some or all of its functionality may be provided by other ones of components 108, 110, 112, 114, 116, 118, 120 and/or other components. As another example, processors 128 and 36 may be configured to execute one or more additional components that may perform some or all of the functionality attributed below to one of components 108, 110, 112, 114, 116, 118, 120 and/or other components.

Figure 8:
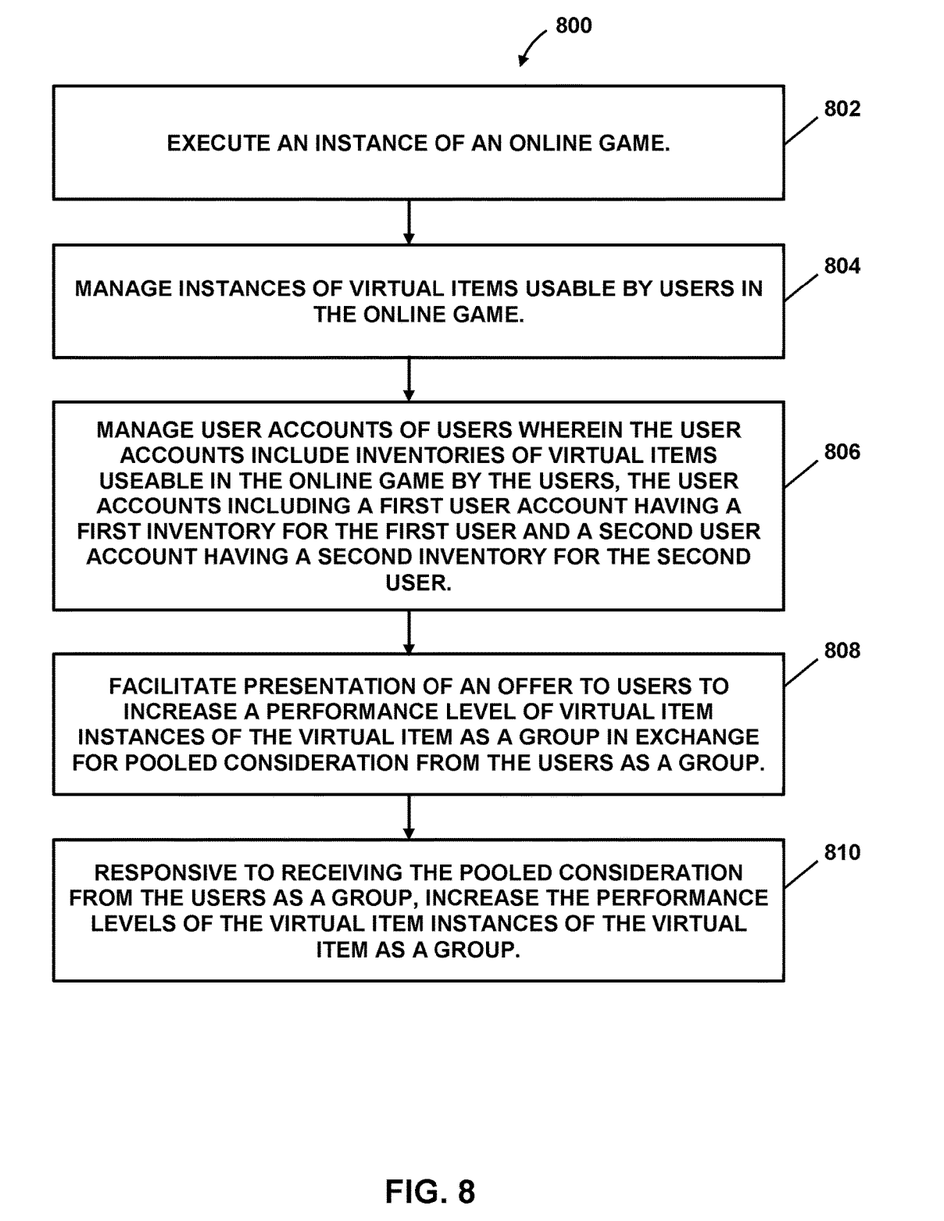
FIG. 8 illustrates a method for increasing attributes of a virtual item in an online game, in accordance with one or more implementations.

FIG. 8 illustrates a method 800 for increasing an attribute of a virtual item type in an online game. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware and/or software to be specifically designed for execution of one or more of the operations of method 800.

At an operation 802 an instance of an online game may be executed. Presentation of views of a game space in which the online game is played to users may be facilitated. Interaction of the users with the online game and/or each other may be enabled by performing operations in the game space in response to commands received from the users. Such operations may be performed by a space component, such as space component 108 in accordance with some implementations.

At an operation 804 instances of virtual items usable by users in the online game are managed. Such operations may be performed by a space component, such as space component 108, in accordance with some implementations.

At an operation 806 user accounts of users are managed. The user accounts may include inventories of virtual items useable in the online game by the users. The user accounts may include a first user account having a first inventory for the first user. The first inventory may indicate that the first user has a first virtual item instance of a first virtual item for use in the online game. The user accounts may include a second user account having a second inventory for the second user. The second inventory may indicate that the second user has a second virtual item instance of the first virtual item for use in the online game. Such operations may be performed by a user component, such as user component 110, in accordance with some implementations.

At an operation 808, presentation of an offer to users to increase a performance level of virtual item instances of the first virtual item as a group in exchange for pooled consideration from the users as a group is facilitated. The first offer may be presented to the first user and the second user to increase performance levels of the first virtual item instance of the first virtual item and the second virtual item instance of the first virtual item. Such operations may be performed by an offer component, such as offer component 116, in accordance with some implementations.

At an operation 810 the performance levels of the virtual item instances of the virtual item may be increased as a group. The performance levels may be increased responsive to receiving the pooled consideration from the users as a group. As such, the first virtual item instance and/or the second virtual item instance of the first virtual item may be increased for the first user and/or the second user in exchange for the first user and/or the second user tendering a first amount of pooled consideration as a group. Such an increase may result in an increase of the performance level of the first virtual item instance and/or the second virtual item instance. Such operations may be performed by a virtual item performance component, such as virtual item performance component 114, in accordance with some implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for increasing an attribute of a virtual item, the system comprising: one or more physical computer processors configured by machine-readable instructions to:

execute an instance of an online game and to facilitate presentation of views of a game space in which the online game is played to users, to enable interaction of the users with the online game and/or each other by performing operations in the game space in response to commands received from the users;

manage instances of virtual items usable by users in the online game;

manage user accounts of users wherein the user accounts include inventories of virtual items useable in the online game by the users, the user accounts including:

a first user account having a first inventory for the first user, the first inventory indicating that the first user has a first virtual item instance of a first virtual item for use in the online game; and a second user account having a second inventory for the second user, the second inventory indicating that the second user has a second virtual item instance of the first virtual item for use in the online game;

facilitate presentation of an offer to users to adjust an attribute of virtual item instances of the virtual item as a group in exchange for pooled consideration from multiple ones of the users, such that a first offer is presented to the first user and the second user to adjust attributes of the first virtual item instance of the first virtual item and the second virtual item instance of the first virtual item; and responsive to receiving the pooled consideration from the multiple ones of the users, adjust the attributes of the virtual item instances of the virtual item for the multiple ones of the users, such that the first virtual item instance and the second virtual item instance of the first virtual item are adjusted for the first user and the second user in exchange for the first user and the second user tendering an amount of pooled consideration, wherein such adjustment results in a change of the attribute of the first virtual item instance and the second virtual item instance.

2. The system of claim 1 wherein individual ones of the virtual items have a virtual item type and a performance level associated with the attribute of the virtual item, such that the first virtual item has a first virtual item type and a first performance level associated with a first attribute of the first virtual item.

3. The system of claim 1 wherein the one or more physical computer processors are configured to manage affiliations within the online game, a given affiliation within the online game comprising a discrete group of users with a relationship having a functional significance within the online game, the affiliations within the online game comprising a first affiliation of a first discrete group of users including the first user and the second user.

4. The system of claim 1 wherein responsive to the first user having the first instance of the first virtual item in the first inventory and the second user having a second instance of the first virtual item in the second inventory, the first user and the second user are presented with the offer to adjust the attribute of the first virtual item instance and the second virtual item instance of the first virtual item.

5. The system of claim 1, wherein adjusting the attribute of the first virtual item instance and the second virtual item instance of the first virtual item as a group is responsive to a first amount of pooled consideration by the group reaching a consideration threshold.

6. The system of claim 1, wherein adjusting the attribute of the first virtual item instance and the second virtual item instance of the first virtual item as a group is responsive to the users in the group reaching a user threshold, the user threshold indicating a quantity of users that are required to contribute to the first amount of pooled consideration as a group.

7. The system of claim 1, wherein adjusting the attribute of the first virtual item instance and the second virtual item instance of the first virtual item is proportional to the number of users in the group, and/or proportional to the pooled consideration tendered by the users in the group.

8. The system of claim 1, wherein the first virtual item is a battle card.

9. The system of claim 1, wherein the first virtual item is a game object having attacking and/or defensive attributes.

10. The system of claim 1, wherein the one or more physical computer processors are configured to facilitate presentation of a notification of a user threshold and/or a consideration threshold to the users in the group.

11. A method for increasing an attribute of a virtual item in an online game, the method being implemented in system including one or more computer physical processors and storage media storing machine readable instructions, the method comprising:

executing an instance of an online game and to facilitate presentation of views of a game space in which the online game is played to users, and to enable interaction of the users with the online game and/or each other by performing operations in the game space in response to commands received from the users managing instances of virtual items usable by users in the online game;

managing user accounts of users wherein the user accounts include inventories of virtual items useable in the online game by the users, the user accounts including:

a first user account having a first inventory for the first user, the first inventory indicating that the first user has a first virtual item instance of a first virtual item for use in the online game; and, a second user account having a second inventory, the second inventory for the second user indicating that the second user has a second virtual item instance of the first virtual item for use in the online game;

facilitate presentation of an offer to users to adjust an attribute of virtual item instances of the virtual item as a group in exchange for pooled consideration from multiple ones of the users, such that a first offer is presented to the first user and the second user to adjust attributes of the first virtual item instance of the first virtual item and the second virtual item instance of the first virtual item; and responsive to receiving the pooled consideration from the multiple ones of the users, adjusting the attributes of the virtual item instances of the virtual item for the multiple ones of the users, such that the first virtual item instance and the second virtual item instance of the first virtual item are adjusted for the first user and the second user in exchange for the first user and the second user tendering an amount of pooled consideration, wherein such adjustment results in a change of the attribute of the first virtual item instance and the second virtual item instance.

12. The method of claim 11 wherein individual ones of the virtual items have a virtual item type and a performance level associated with the attribute of the virtual item, the virtual items including a virtual item having a first virtual item type and a first performance level associated with a first attribute of the first virtual item.

13. The method of claim 11, further comprising managing affiliations within the online game, a given affiliation within the online game comprising a discrete group of users with a relationship having a functional significance within the online game, the affiliations within the online game comprising a first affiliation of a first discrete group of users including the first user and the second user.

14. The method of claim 11, wherein responsive to the first user and the second user having the first instance of the first virtual item in the first inventory and the second user having a second instance of the first virtual item in the second inventory, the first user and the second user are presented with the offer to adjust the attribute of the first virtual item instance and the second virtual item instance of the first virtual item.

15. The method of claim 11, wherein adjusting the attribute of the first virtual item instance and the second virtual item instance of the first virtual item as a group is responsive to the first amount of pooled consideration by the group reaching a consideration threshold.

16. The method of claim 11, wherein adjusting the attribute of the first virtual item instance and the second virtual item instance of the first virtual item as a group is responsive to the users in the group reaching a user threshold, the user threshold indicating a quantity of users that are required to contribute to the first amount of pooled consideration as a group.

17. The method of claim 11, wherein adjusting the attribute of the first virtual item instance and the second virtual item instance of the first virtual item is proportional to the number of users in the group, and/or proportional to the pooled consideration tendered by the users in the group.

18. The method of claim 11 wherein the first virtual item is a battle card.

19. The method of claim 11 wherein the first virtual item is a game object having attacking and/or defensive attributes.

20. The method of claim 11, further comprising facilitating presentation of a notification of a user threshold and/or a consideration threshold to the users in the group.

* * * * *